United States Patent
Cui et al.

(10) Patent No.: US 10,912,016 B2
(45) Date of Patent: Feb. 2, 2021

(54) DYNAMIC NETWORK BASED SLICE SELECTION FOR A USER EQUIPMENT OR AN APPLICATION OF THE USER EQUIPMENT IN ADVANCED NETWORKS

(71) Applicant: AT&T INTELLECTUAL PROPERTY I, L.P., Atlanta, GA (US)

(72) Inventors: Zhi Cui, Sugar Hill, GA (US); Farooq Bari, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 51 days.

(21) Appl. No.: 16/104,796

(22) Filed: Aug. 17, 2018

(65) Prior Publication Data

US 2020/0059856 A1 Feb. 20, 2020

(51) Int. Cl.
| | |
|---|---|
| *H04W 48/18* | (2009.01) |
| *H04W 8/08* | (2009.01) |
| *H04L 12/26* | (2006.01) |
| *H04W 24/02* | (2009.01) |
| *H04L 12/24* | (2006.01) |
| *H04W 48/14* | (2009.01) |

(52) U.S. Cl.
CPC ......... *H04W 48/18* (2013.01); *H04L 41/0893* (2013.01); *H04L 41/0896* (2013.01); *H04L 43/087* (2013.01); *H04L 43/0829* (2013.01); *H04W 8/08* (2013.01); *H04W 24/02* (2013.01); *H04W 48/14* (2013.01)

(58) Field of Classification Search
None
See application file for complete search history.

(56) References Cited

U.S. PATENT DOCUMENTS

| 9,967,801 B2 | 5/2018 | Byun et al. |
| 2017/0054595 A1 | 2/2017 | Zhang et al. |
| 2017/0289791 A1* | 10/2017 | Yoo ..................... H04W 68/005 |

(Continued)

FOREIGN PATENT DOCUMENTS

| CN | 107071799 A | 8/2017 |
| WO | 2018006784 A1 | 1/2018 |

(Continued)

OTHER PUBLICATIONS

Mayer, Georg. "3GPP Network Slicing", Huawei, 3GPP Global Initiative, retrieved Jun. 18, 2018, 10 pages.

*Primary Examiner* — Mohammad S Adhami
(74) *Attorney, Agent, or Firm* — Amin, Turocy & Watson, LLP

(57) ABSTRACT

Dynamic network based slice selection for a user equipment (UE) or an application of the UE in advanced networks (e.g., 5G and beyond) is presented herein. A dynamic slice selection system can comprise a data collection component and an analytics component. The data collection component can determine a network slice that is being used by a wireless device and a service that is being provided, via the network slice, to the wireless device—the network slice being associated with a virtual network function. Further, an analytics component can obtain performance data corresponding to the service being provided, via the network slice, to the wireless device, and based on the performance data, determine whether the network slice satisfies a defined condition with respect to providing the service to the wireless device.

20 Claims, 10 Drawing Sheets

(56) References Cited

U.S. PATENT DOCUMENTS

| | | | |
|---|---|---|---|
| 2017/0303259 A1 | 10/2017 | Lee et al. | |
| 2017/0332226 A1 | 11/2017 | Bharatia | |
| 2017/0339688 A1 | 11/2017 | Singh et al. | |
| 2018/0035399 A1 | 2/2018 | Xu et al. | |
| 2018/0123878 A1 | 5/2018 | Li et al. | |
| 2018/0123961 A1 | 5/2018 | Farmanbar et al. | |
| 2019/0342761 A1* | 11/2019 | Yu | H04W 48/16 |
| 2019/0357130 A1* | 11/2019 | Garcia Azorero | H04W 48/18 |
| 2020/0068473 A1* | 2/2020 | Tang | H04L 5/0001 |

FOREIGN PATENT DOCUMENTS

| | | |
|---|---|---|
| WO | 2018034924 A1 | 2/2018 |
| WO | 2018079690 A1 | 5/2018 |
| WO | 2018093168 A1 | 5/2018 |

\* cited by examiner

300 →

302 →

|  | App. 1 | App. 2 | App. 3 |
|---|---|---|---|
| Slice 1 | X | X |  |
| Slice 2 |  |  | X |
|  |  |  |  |

304 →

|  | App. 1 | App. 2 | App. 3 |
|---|---|---|---|
| Slice 1 | X |  |  |
| Slice 2 |  |  | X |
| Slice 3 |  | X |  |

DYNAMIC NETWORK BASED SLICE SELECTION FOR A USER EQUIPMENT OR AN APPLICATION OF THE USER EQUIPMENT IN ADVANCED NETWORKS

TECHNICAL FIELD

The subject disclosure generally relates to embodiments for dynamic network based slice selection for a user equipment (UE) or an application of the UE in advanced networks (e.g., 5G and beyond).

BACKGROUND

Conventional wireless network technologies aim to support a diverse array of applications having very different communication requirements. In this regard, 5G network slicing will allow wireless service providers to utilize virtual networks to support a varied number of services corresponding to different communication requirements, e.g., communication capacity, speed, latency, availability, etc. over a common physical mobile network.

Third generation partnership project (3GPP) based networks pre-provision a UE with a policy specifying a slice, or virtual function, the UE can utilize. In turn, once the UE attaches to the slice, the UE must continue to use the slice even after such use becomes non-optimal over a period of time. Further, 3GPP based networks limit slice data analysis to slice congestion related information, even though other quality of service (QoS) information, e.g., jitter, delay, etc. of a slice may have more of an impact on UE and/or application performance. Consequently, conventional wireless network technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 3 illustrates a block diagram of tables representing respective uses of slices for respective applications of a wireless device, in accordance with various example embodiments;

DETAILED DESCRIPTION

Figure 1:
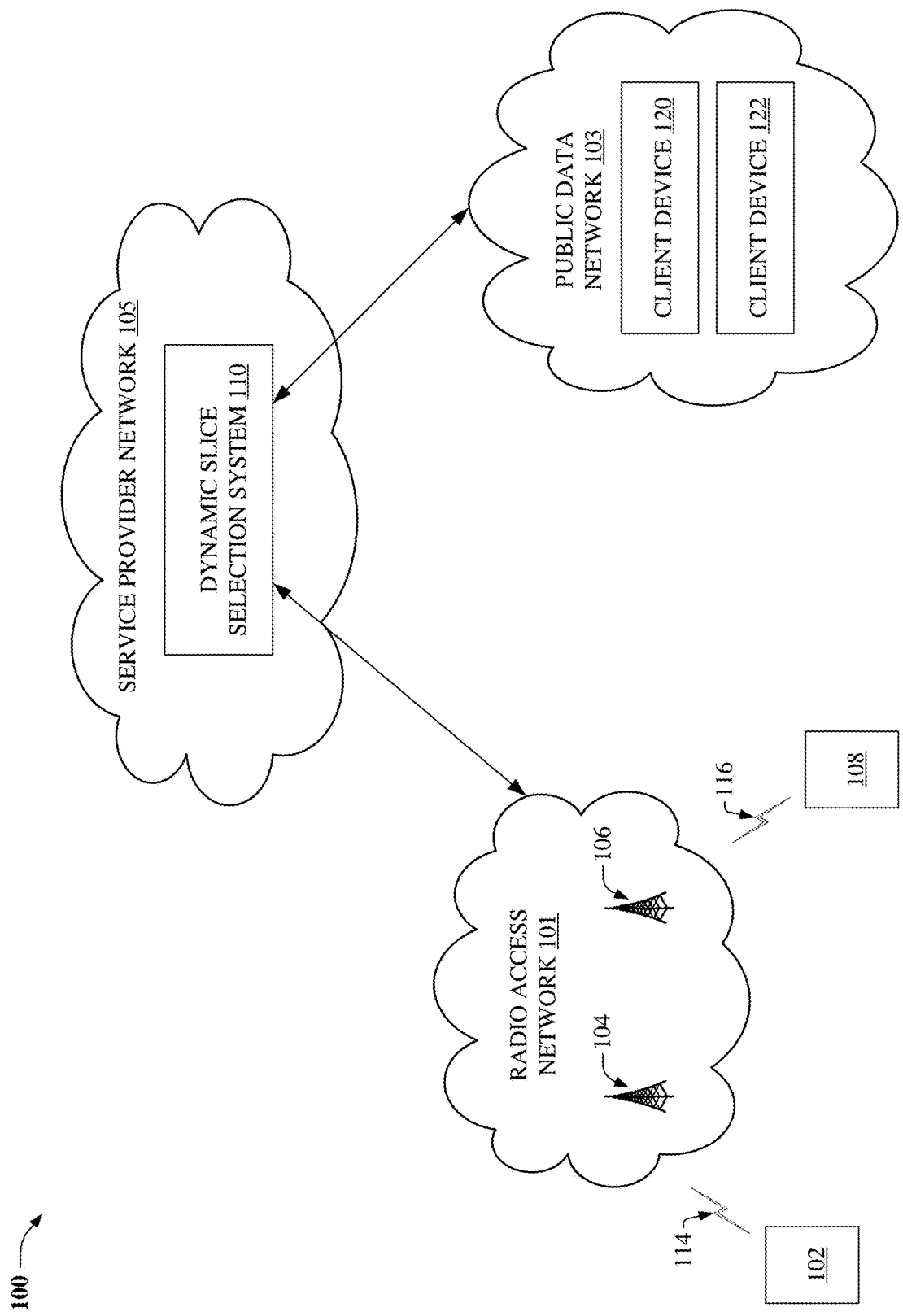
FIG. 1 illustrates a block diagram of a dynamic network based slice selection environment, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional wireless network technologies have had some drawbacks with respect to pre-provisioning a UE to use a particular slice during operation of the UE. In this regard, once the UE attaches to and uses the slice, the UE must continue to use the slice even after the slice may become non-optimal over time. Further, although conventional wireless technologies analyze slice congestion, such technologies disregard other quality of service (QoS) information, e.g., jitter, average delay, etc. of a slice that may directly affect wireless device performance. On the other hand, various embodiments described herein can improve subscriber experience(s) and facilitate optimal use of wireless network resources by dynamically selecting, e.g., based on a past usage, usage pattern, etc. of the UE, a slice for the UE or an application of the UE.

For example, in an embodiment, a dynamic slice selection system, e.g., a network data analytics function (NWDAF), can comprise a data collection component and an analytics component. The data collection component can determine a network slice (e.g., associated with a virtual network function) that is being used by a wireless device. Further, the data collection component can determine a service that is being provided, via the network slice, to the wireless device. For example, in embodiment(s), the data collection component can determine an application that is being used by the wireless device, and determine that the network slice is being utilized by the application for the service.

In other embodiment(s), the wireless device can comprise an internet of things (IoT) device, an appliance, a security device, a utility meter, a cellular phone, a smartphone, a vehicle control device, etc. In yet other embodiment(s), the service can comprise a communication service, an Internet based service, a security service, a utility meter based service, an automated vehicle based service, a remote medical device based service, etc.

Further, the analytics component can obtain performance data corresponding to the service being provided, via the network slice, to the wireless device, and determine, based on the performance data, whether the network slice satisfies a defined condition, e.g., QoS, with respect to providing the service to the wireless device.

In embodiment(s), the performance data comprises an amount of packet loss corresponding to data being received by the wireless device, an average delay of the data, a peak delay of the data, a jitter corresponding to a periodic property of the data, a bandwidth, e.g., bit rate, throughput, etc. representing an amount of the data being received by the wireless device within a defined period, an availability of the service, a reliability, e.g., QoS, security, power, robustness, etc. metric corresponding to the service, etc.

In another embodiment, the analytics component can determine, based on the performance data, whether the network slice satisfies the defined condition with respect to a type of the application. In this regard, the application can comprise a communication application, a web browser, a video sharing website, a music sharing website, a video streaming application, a music streaming application, a news streaming application, an IoT based application, a home security application, a vehicle based application, etc.

In yet another embodiment, in response to a determination, by the analytics component based on the performance data, that the network slice does not satisfy the defined condition with respect to the providing the service to the wireless device, the analytics component can select another network slice for the providing the service to the wireless device—the other network slice being determined to satisfy the defined condition with respect to the providing the service to the wireless device, e.g., based on a defined condition with respect to the performance data, e.g., the defined condition representing a maximum amount of packet loss, average delay, peak delay, jitter, etc. allowed for the providing the service via the other network slice; representing a minimum required bandwidth for the providing the service via the other network slice; representing the availability of the service via the other network slice; representing a minimum required reliability metric corresponding to the providing the service via the other network slice, etc.

In embodiment(s), the analytics component can select the other network slice from a group of existing, available, etc. network slices. In other embodiment(s), the analytics component can create the other slice for the providing the service to the wireless device.

In an embodiment, the analytics component can send a recommendation directed to an access and mobility management function (AMF) of a core network to facilitate the providing the service to the wireless device. In this regard, in one embodiment, the analytics component can send the recommendation directed to the AMF in response to a determination that the AMF has subscribed, e.g., via a network based notification service, to receive such recommendations from the dynamic slice selection system. In another embodiment, the analytics component can send the recommendation directed to the AMF in response receiving a query from the AMF. In yet another embodiment, the analytics component can update, via a policy server, a network policy directing the wireless device to utilize the other slice.

In one embodiment, a method can comprise determining, by a system comprising a processor, whether a characteristic of a communication service being provided to a wireless device via a first virtual network function satisfies a defined condition corresponding to an application of the wireless device; and in response to characteristic being determined not to satisfy the defined condition, reassigning a second virtual network function to the wireless device to facilitate providing the service to the wireless device via the second virtual network function.

In embodiment(s), the determining whether the characteristic satisfies the defined condition comprises: determining at least one of an average delay of data being received, via the first virtual network function, by the wireless device or a peak delay of the data; determining a jitter corresponding to data being received, via the first virtual network function, by the wireless device; and/or determining a bandwidth representing an amount of data being received, via the first virtual network function, by the wireless device over a defined period of time.

In an embodiment, the reassigning comprises creating the second virtual network function to facilitate the providing the service to the wireless device via the second virtual network function in response to the characteristic being determined not to satisfy the defined condition. In another embodiment the reassigning comprises selecting the second virtual network function from a group of existing, available, etc. network functions to facilitate the providing of the service to the wireless device via the second virtual network function.

In yet another embodiment, the reassigning comprises sending a recommendation of the reassigning directed to the AMF to facilitate the providing the service to the wireless device via the second virtual function in response to receiving a query from the AMF. In this regard, the AMF can update policy information instructing the wireless device to utilize the second virtual network function for the service, and send the updated policy information, policy, etc. directed to the UE to facilitate the providing the service to the wireless device via the second virtual function.

In an embodiment, a machine-readable storage medium can comprise executable instructions that, when executed by a processor, facilitate performance of operations, comprising: determining whether a communication characteristic of a first network slice being used by a wireless device satisfies a defined condition representing that the first network slice is inadequate for a corresponding application of the wireless device; and in response to the communication characteristic being determined to satisfy the defined condition representing that the first network slice is inadequate for the corresponding application, modifying a slice policy of the wireless device to facilitate use of a second network slice for the corresponding application of the wireless device.

In one embodiment, the modifying comprises sending, via an AMF, policy information represented by the slice policy to the wireless device to facilitate the use of the second network slice for the corresponding application of the wireless device.

In other embodiment(s), the determining comprises determining an average delay of data being received by the wireless device; a peak delay of the data being received by the wireless device; a jitter corresponding to a periodic property of the data being received by the wireless device; and/or a bandwidth representing an amount of the data being received by the wireless device within a defined period.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As mentioned above, conventional wireless network technologies have had some drawbacks with respect to mapping of slice types to respective applications of a wireless device being fixed, e.g., during provisioning of the wireless device. In this regard, such mapping may not be optimal for the wireless device, or the respective applications, over time. To address these and other concerns of conventional wireless technologies, various embodiments disclosed herein can improve customer experiences and facilitate optimal use of wireless network resources by selecting an optimal slice for a wireless device after monitoring a use, by the wireless device, of a slice that had been originally assigned to the wireless device for such use.

Figure 2:
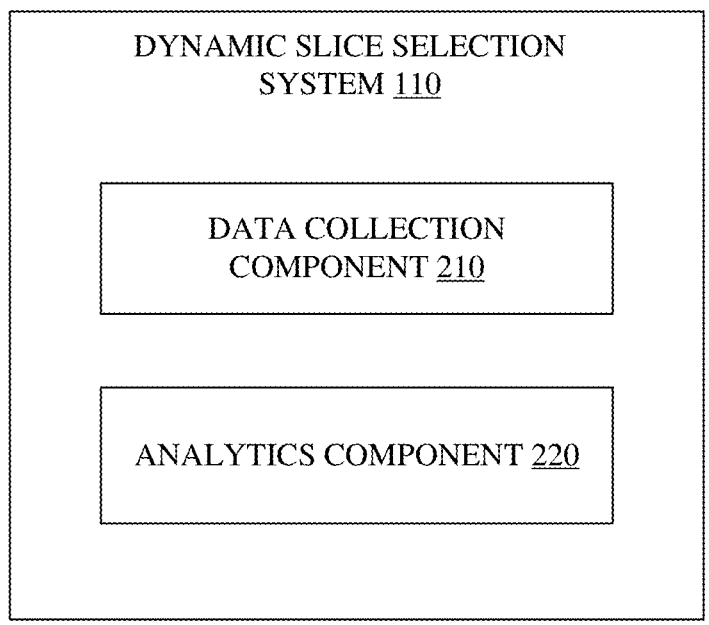
FIG. 2 illustrates a block diagram of a dynamic slice selection system, in accordance with various example embodiments.

In this regard, and now referring to FIGS. 1 and 2, block diagrams of a dynamic network based slice selection environment (100) and a dynamic slice selection system (110) are illustrated, respectively, in accordance with various example embodiments. The dynamic network based slice selection environment can comprise wireless devices (102, 108) wirelessly connected, via a service provider network (105), to respective client devices (120, 122) of a public data network (PDN) (103), e.g., the Internet, etc.

The service provider network comprises various components, e.g., a network exposure function (NEF), an NWDAF, an application function (AF), a policy control function (PCF), an AMF, a session management function (SMF), a network slice selection function (NSSF), etc. (all not shown) that can affect the provisioning and use of network slices, e.g., virtual network functions, in embodiments described herein. In this regard, the service provider network can pre-provision, based on respective policies, each wireless device of the wireless devices, e.g., a UE, an IoT device, an appliance, a security device, a utility meter, a cellular phone, a smartphone, a vehicle control device, etc. with information representing slice(s), type(s) of slice(s), etc. the wireless device should attach to, e.g., to facilitate use, by the wireless devices via a RAN (101), of respective services corresponding to the respective client devices (120, 122)—such services comprising, e.g., a communication service, an Internet based service, a security service, a utility meter based service, an automated vehicle based service, a remote medical device based service, etc.

In turn, the wireless device can map, using mapping table(s), respective applications that are executing on the wireless device to the slice(s), types of slice(s), etc. to facilitate the use of the respective services. In embodiment (s), the respective applications can comprise a communication application, e.g., a voice over Internet protocol (VoIP) application, a web browser, a video sharing website, a music sharing website, a video streaming application, a music streaming application, a news streaming application, an IoT based application, a home security application, a vehicle based application, etc. In this regard, as illustrated by FIG. 3, mapping table 302 represents the wireless device being pre-provisioned to attach to a first slice ("Slice 1") and a second slice ("Slice 2"). Further, FIG. 3 illustrates a first application ("App. 1") and a second application ("App. 2") being mapped, by the wireless device, to Slice 1-App. 1 and App. 2 using Slice 1 to perform corresponding services. In addition, FIG. 3 illustrates a third application ("App. 3") being mapped, by the wireless device, to Slice 2-App. 3 using Slice 2 to perform a service.

Returning now to FIG. 1, the RAN (101) can comprise various coverage cells, or wireless coverage areas, to communicatively couple, via respective wireless radio links (e.g., 104, 106), the wireless devices to the service provider network to facilitate the use of the respective services. In this regard, the service provider network can comprise cellular wireless technologies, e.g., 4G, 5G, and beyond; 3GPP UMTS; high speed packet access (HSPA); 3GPP LTE; third generation partnership project 2 (3GPP2); ultra-mobile broadband (UMB); LTE-A; etc. corresponding to RAN 101. In turn, the RAN can comprise base station(s) (e.g., 104, 106), base transceiver station(s), access point(s), etc. and associated electronic circuitry and deployment site(s), in addition to the respective wireless radio links, operated in accordance with the base station(s), etc.

The respective radio links can comprise an over-the-air wireless link comprising a downlink (DL) and an uplink (UL) (both not shown) that can utilize a predetermined band of radio frequency (RF) spectrum associated with, e.g., 4G, 5G, and beyond; cellular; LTE; LTE advanced (LTE-A); GSM; 3GPP universal mobile telecommunication system (UMTS); Institute of Electrical and Electronics Engineers (IEEE) 802.XX technology (WiFi, Bluetooth, etc.); worldwide interoperability for microwave access (WiMax); a wireless local area network (WLAN); Femto; near field communication (NFC); Wibree; Zigbee; satellite; WiFi Direct; etc. Accordingly, the RAN can be associated with RF spectrums corresponding to respective types of wireless technologies including, but not limited to, cellular, WiFi, WiMax, WLAN, Femto, NFC, Wibree, Zigbee, satellite, WiFi Direct, etc.

It should be appreciated that one or more portions of elements, components, etc. of the service provider network (e.g., dynamic slice selection system 110, data collection component 210, analytics component 220, etc.) can be located/included within one or more elements (e.g., hardware, software, etc.) of the dynamic network based slice selection environment, e.g., the RAN (101), etc. In this regard, one or more components of the dynamic slice selection system can be close to various components, elements, etc. of the RAN, e.g., with respect to proximity, communication delay, etc. to facilitate optimized monitoring, selecting, re-selecting, etc. of slices being used by respective services.

Returning to FIG. 2, the data collection component can determine (e.g., via a query that has been sent to, e.g., a wireless device, a network component of the RAN, a network component of the service provider network, a policy server corresponding to the wireless device, etc.) a network slice that is being used by the wireless device, and a service that is being provided, via the network slice, to the wireless device. For example, in embodiment(s), the data collection component can determine, e.g., via the query, an application that is being used by the wireless device, and determine that the network slice is being utilized by the application for the service.

In this regard, with respect to FIG. 3, the data collection component can determine that, e.g., based on querying a policy server of the service provider network, the wireless device was pre-provisioned to attach to Slice 1 and Slice 2. Further, based on a device query that has been sent to the wireless device, the data collection component can determine that the wireless device has mapped App. 1 and App. 2 to Slice 1, and determine that the wireless device has mapped App. 3 to Slice 2—representing that App. 1 and App. 2 will use Slice 1 to perform corresponding services, and App. 3 will use Slice 2 to perform a corresponding service.

Analytics component can obtain performance data associated with the corresponding services being provided, via Slice 1 and Slice 2, to the wireless device, and determine, based on the performance data, whether Slice 1 and Slice 2 satisfy respective defined conditions, qualities of service, etc. with respect to providing the corresponding services to the wireless device. In another embodiment, the analytics component can determine, based on the performance data, whether Slice 1 satisfies a defined condition representing respective qualities of service corresponding to respective application types of App. 1 and App. 2.

In embodiment(s), the performance data comprises an average delay of data being received by the wireless device, a peak delay of the data, a jitter corresponding to a periodic property of the data, a bandwidth representing an amount of the data being received by the wireless device within a defined period, an amount of packet loss corresponding to the data, an availability of the corresponding services, a reliability, e.g., QoS, security, power, robustness, etc. metric for the corresponding services, etc.

In this regard, in response to a determination that Slice 1 does not satisfy a defined condition of the respective defined conditions representing, e.g., a QoS of the respective qualities of service corresponding to an application type of App. 2, an amount, e.g., allowable amount, of packet loss corresponding to the application type, an availability of a service corresponding to the application type, a reliability metric corresponding to the service, etc., the analytics component can select another network slice ("Slice 3") that has been determined to satisfy the defined condition, and as described below, facilitate mapping table 302 being updated, by the wireless device, to obtain mapping table 304—enabling the wireless device to use Slice 3 to perform service(s) associated with App. 2.

In embodiment(s), the analytics component can select Slice 3 from a group of existing, available, etc. network slices. In other embodiment(s), the analytics component can create Slice 3 for the providing the service to the wireless device.

In an embodiment, the analytics component can send a recommendation referencing, noting, etc. the selectin of Slice 3 directed to an AMF (not shown) of the service provider network to facilitate the providing the service to the wireless device via Slice 3. In this regard, in one embodiment, the analytics component can send the recommendation directed to the AMF in response to a determination that the AMF has subscribed, e.g., via a network based notification service, to receive such recommendations from the dynamic slice selection system. In another embodiment, the analytics component can send the recommendation directed to the AMF in response receiving a query from the AMF.

In turn, the AMF can update, via a policy server of the service provider network, a slice policy of the wireless device to obtain an updated slice policy directing the wireless device to utilize Slice 3 for App. 2. Further, the AMF can send the updated slice policy to the wireless device, e.g., to facilitate updating, by the wireless device, of the mapping table for the providing, via App. 2, the service to the wireless device via Slice 3.

In other embodiment(s), the AMF can send the recommendation to the wireless device to inform the wireless device of preferred slice types to be used by the wireless device.

FIGS. 4-8 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
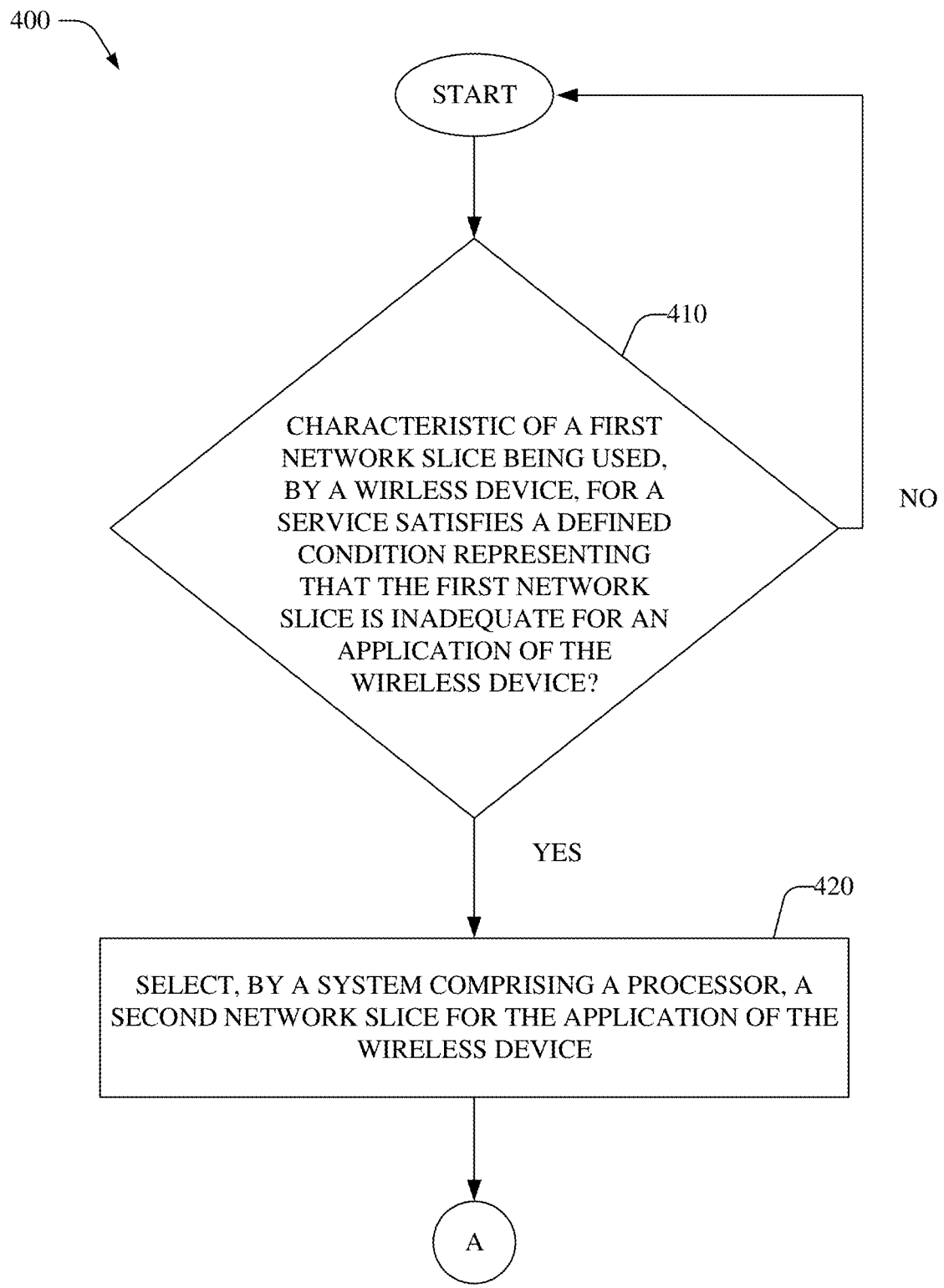
FIGS. 4-5 illustrate flowcharts of a method for dynamic network based slice selection utilizing an AMF, in accordance with various example embodiments.
Figure 5:
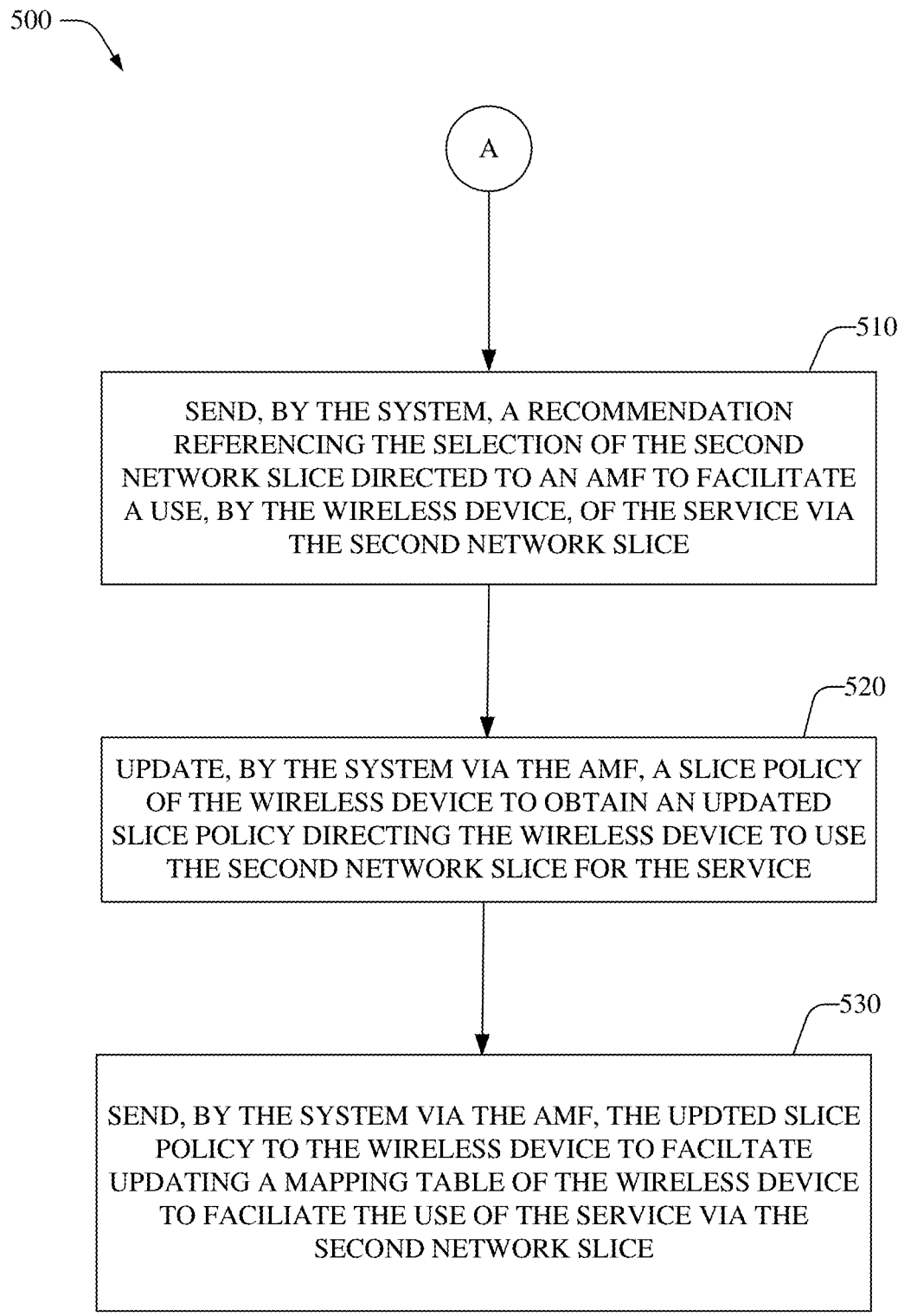

Referring now to FIGS. 4-5, a process (400, 500) performed by a system comprising a processor, e.g., dynamic slice selection system (110), is illustrated, in accordance with various example embodiments. At 410, the system can determine whether a characteristic, e.g., jitter, peak delay, etc. of a first network slice being used by a wireless device for a service satisfies a defined condition representing that the first network slice is inadequate for an application of the wireless device.

In this regard, in response to a determination that the characteristic satisfies the defined condition representing that the first network slice is inadequate for the application, flow continues to 420, at which the system can select a second network slice for the application of the wireless device; otherwise flow returns to 410.

Flow continues from 420 to 510, at which the system can send a recommendation referencing the selection of the second network slice directed to an AMF to facilitate a use, by the wireless device, of the service via the second network slice. At 520, the system can update, via the AMF, a slice policy of the wireless device to obtain an updated slice policy directing the wireless device to use the second network slice for the service. At 530, the system can send, via the AMF, the updated slice policy to the wireless device to facilitate updating a mapping table of the wireless device to facilitate the use of the service via the second network slice.

Figure 6:
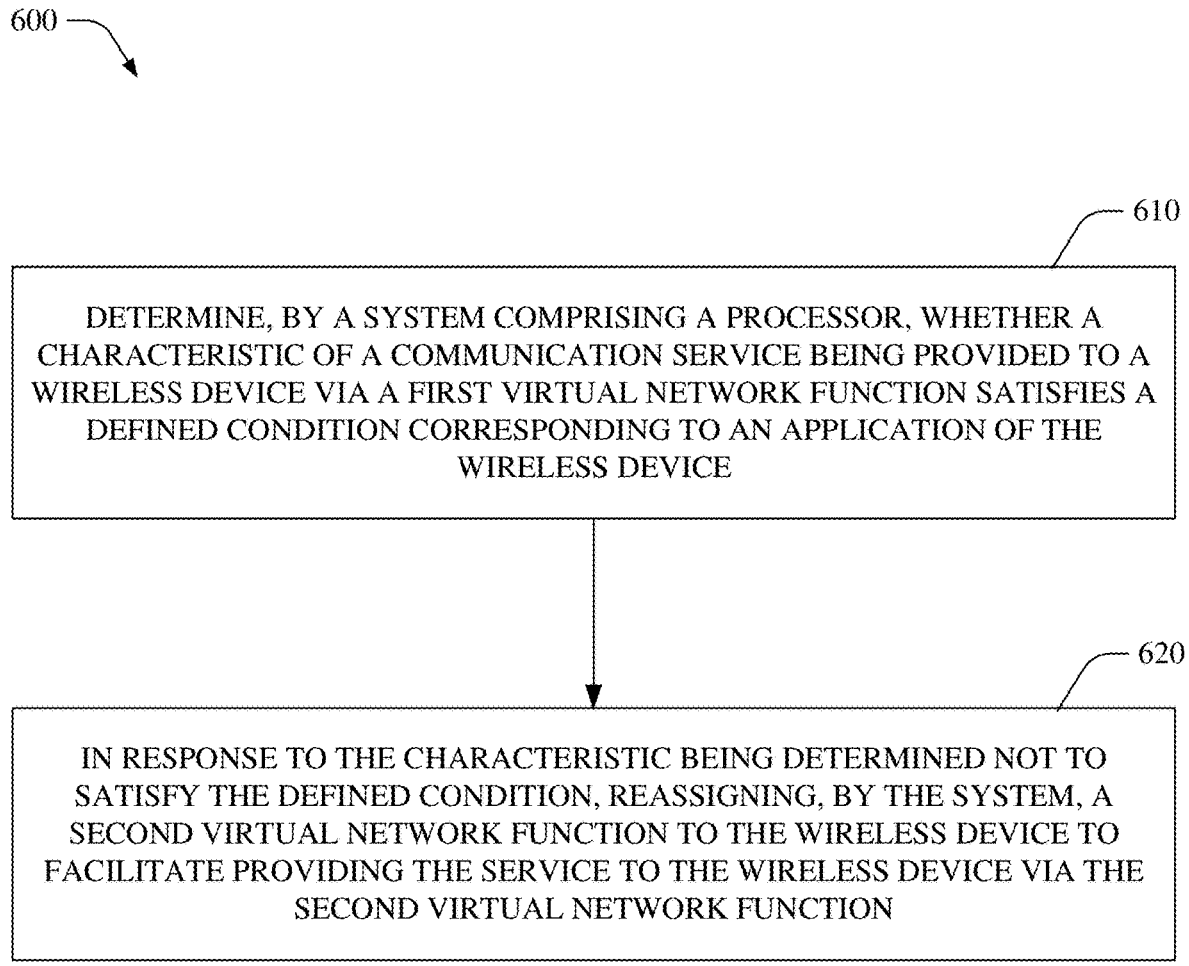
FIG. 6 illustrates a flow chart of a method for dynamically reassigning a virtual network function to a wireless device in response to a determination that a characteristic of a communication service being provided, via the virtual network function, to the wireless device does not satisfy a defined condition corresponding to an application of the wireless device, in accordance with various example embodiments.

FIG. 6 illustrates another process (600) performed by a system, e.g., dynamic slice selection system (110), in accordance with various example embodiments. At 610, the system can determine whether a characteristic of a communication service being provided to a wireless device via a first virtual network function satisfies a defined condition corresponding to an application of the wireless device. At 620, in response to the characteristic being determined not to satisfy the defined condition, the system can reassign a second virtual network function to the wireless device to facilitate providing the service to the wireless device via the second virtual network function.

Figure 7:
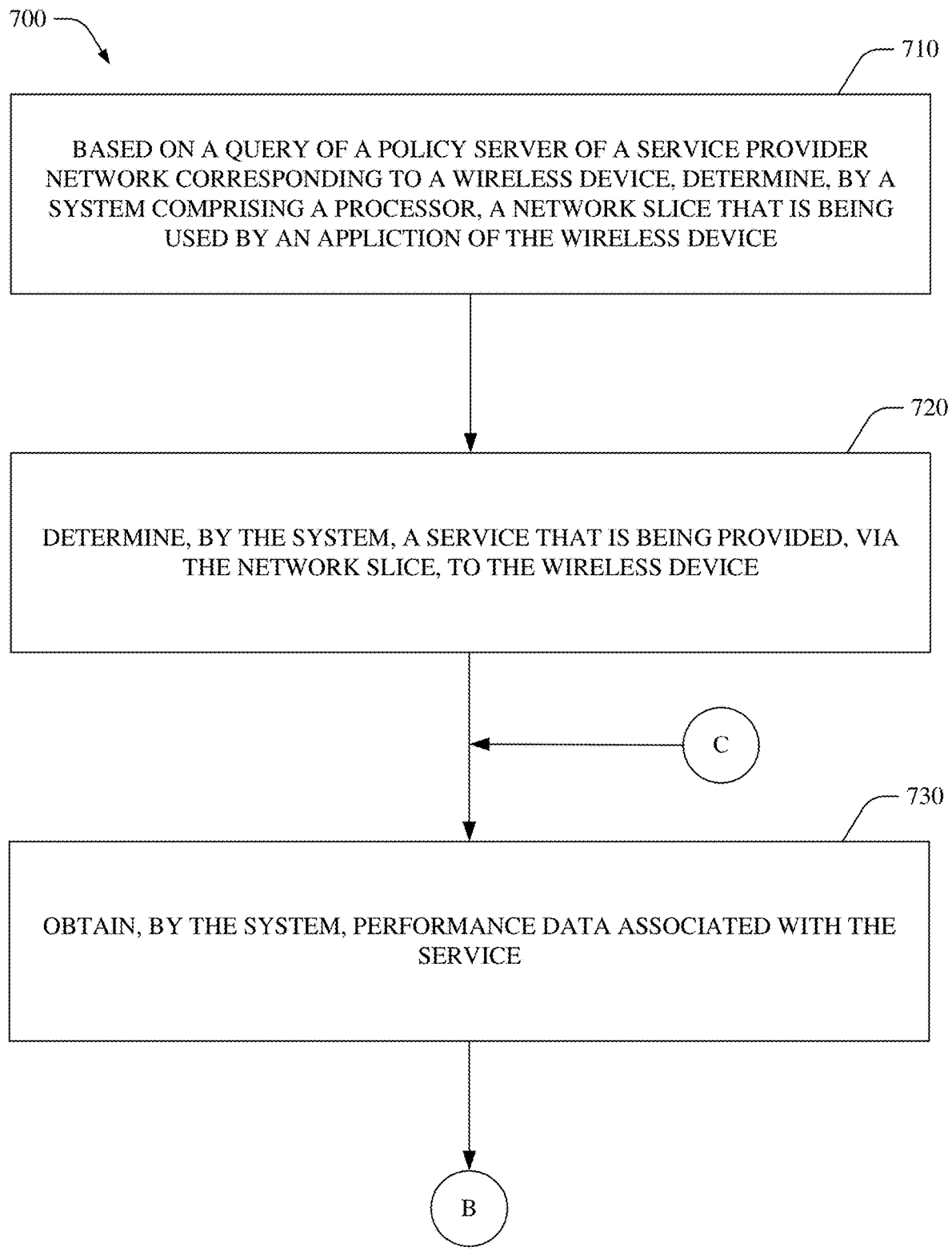
FIGS. 7-8 illustrate flow charts of a method for facilitating an update of a mapping table of a wireless device specifying a use of a slice by an application of the wireless device, in accordance with various example embodiments.
Figure 8:
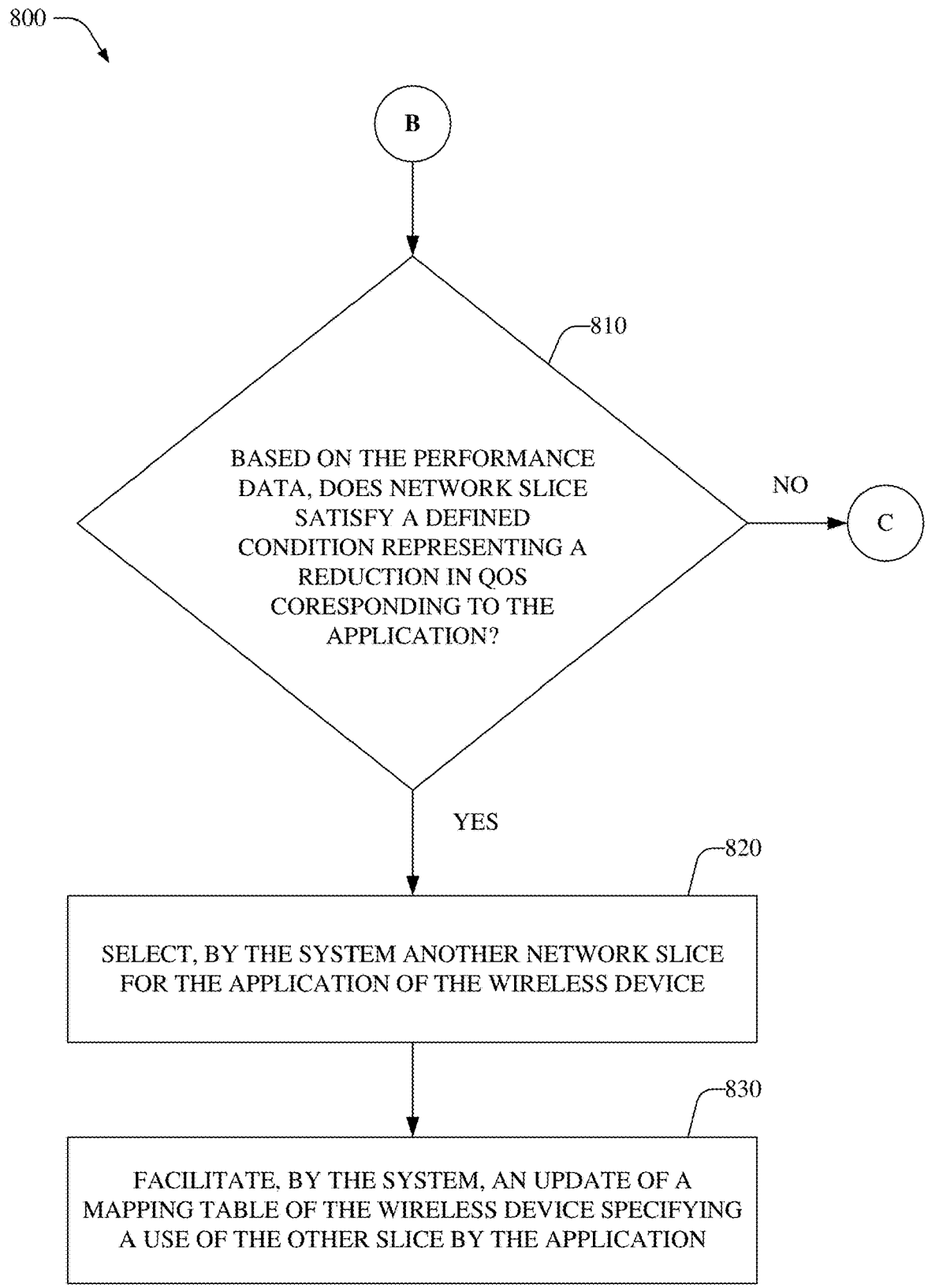

FIGS. 7-8 illustrate yet another process (700, 800) performed by a system (e.g., 110), in accordance with various example embodiments. At 710, the system can determine, based on a query of a policy server of a service provider network corresponding to a wireless device, a network slice that is being used by an application of the wireless device. At 720, the system can determine a service that is being provided, via the network slice, to the wireless device. At 730, the system can obtain performance data associated with the service.

At 810, it can be determined, based on the performance data, whether the network slice satisfies a defined condition representing a reduction in QoS corresponding to the application. In this regard, in response to determining that the network slice satisfies the defined condition representing a reduction in the QoS corresponding to the application, flow continues to 820, at which the system can select another network slice for the application of the wireless device; otherwise flow returns to 730. Flow continues from 820 to 830, at which the system can facilitate an update of a mapping table of the wireless device specifying a use of the other slice by the application.

Figure 9:
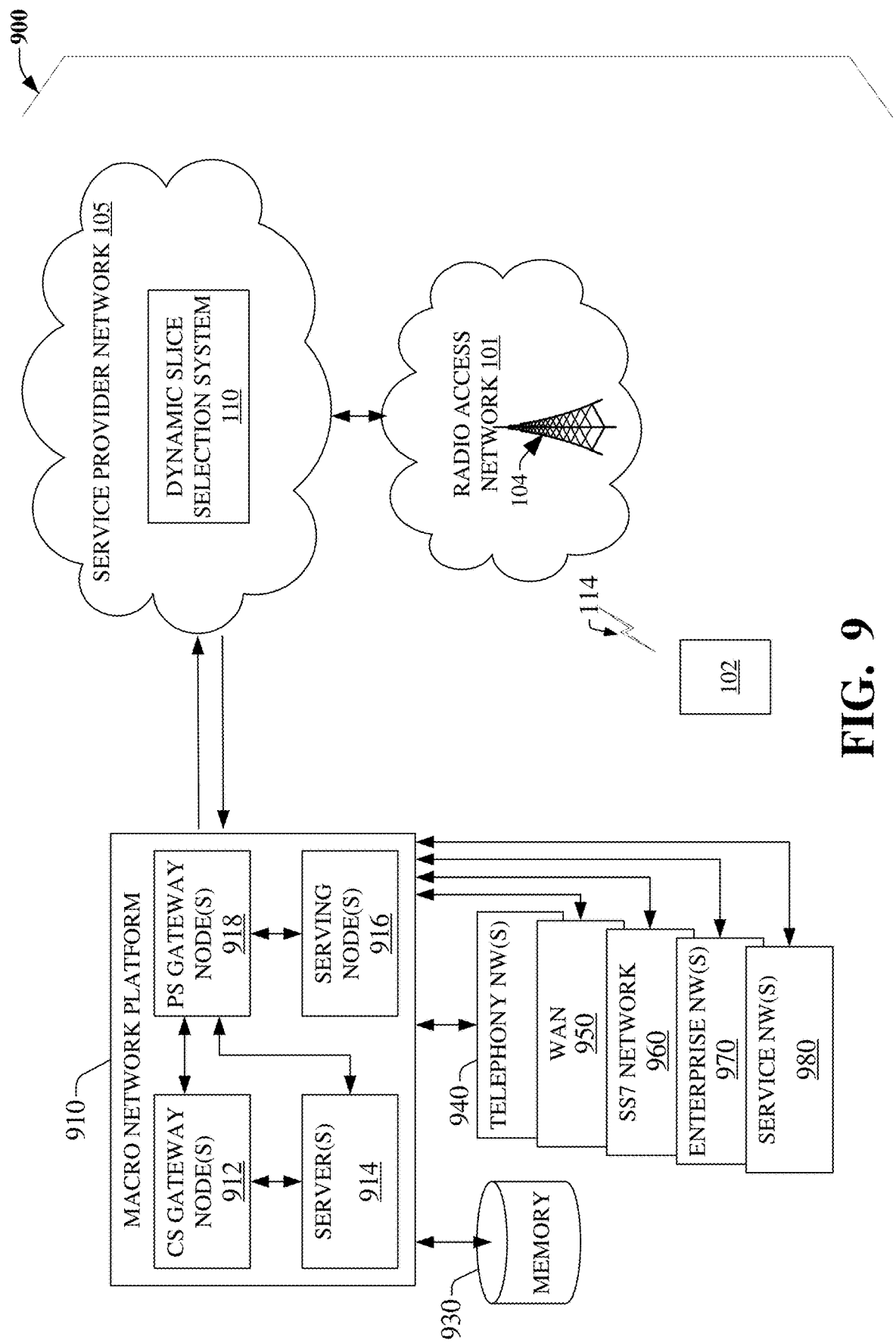
FIG. 9 illustrates a block diagram of a wireless network environment, in accordance various example embodiments.

With respect to FIG. 9, a wireless communication, e.g., core network, environment 900 including macro network platform 910 is illustrated, in accordance with various embodiments. Macro network platform 910 serves or facilitates communication, via slice(s) (not shown), with a wireless device (e.g., 102, 108).

Generally, macro network platform 910 includes components, e.g., nodes, GWs, interfaces, servers, policy servers, platforms, etc. that facilitate both packet-switched (PS), e.g., IP, frame relay, asynchronous transfer mode (ATM), and circuit-switched (CS) traffic, e.g., voice and data, and control generation for networked wireless communication, e.g., via dynamic slice selection system 110. In various embodiments, macro network platform 910 includes CS gateway (GW) node(s) 912 that can interface CS traffic received from legacy networks like telephony network(s) 940, e.g., public switched telephone network (PSTN), public land mobile network (PLMN), Signaling System No. 7 (SS7) network 960, etc. CS GW node(s) 912 can authorize and authenticate traffic, e.g., voice, arising from such networks. Additionally, CS GW node(s) 912 can access mobility or roaming data generated through SS7 network 960; for instance, mobility data stored in a visitor location register (VLR), which can reside in memory 930. Moreover, CS GW node(s) 912 interfaces CS-based traffic and signaling with PS GW node(s) 918. As an example, in a 3GPP UMTS network, PS GW node(s) 918 can be embodied in GW general packet radio service (GPRS) support node(s) (GGSN).

As illustrated by FIG. 9, PS GW node(s) 918 can receive and process CS-switched traffic and signaling via CS GW node(s) 912. Further PS GW node(s) 918 can authorize and authenticate PS-based data sessions, e.g., via wireless network 101, with served devices, communication devices, etc. Such data sessions can include traffic exchange with networks external to macro network platform 910, like wide area network(s) (WANs) 950; enterprise networks (NWs) 970, e.g., E911, service NW(s) 980, e.g., an IP multimedia subsystem (IMS), etc. It should be appreciated that local area network(s) (LANs), which may be a part of enterprise NW(s) 970, can also be interfaced with macro network platform 910 through PS GW node(s) 918. PS GW node(s) 918 can generate packet data contexts when a data session is established, e.g., associated with an EPS bearer context activation. To that end, in an aspect, PS GW node(s) 918 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), PS GW node(s) 918 (e.g., GGSN) and tunnel interface (e.g., TTG) comprise a packet data GW (PDG).

Macro network platform 910 also includes serving node(s) 916 that can convey the various packetized flows of information, or data streams, received through PS GW node(s) 918. As an example, in a 3GPP UMTS network, serving node(s) can be embodied in serving GPRS support node(s) (SGSN).

As indicated above, server(s) 914 in macro network platform 910 can execute numerous applications, e.g., messaging, location services, wireless device management, etc. that can generate multiple disparate packetized data streams or flows; and can manage such flows, e.g., schedule, queue, format. Such application(s), for example, can include add-on features to standard services provided by macro network platform 910. Data streams can be conveyed to PS GW node(s) 918 for authorization/authentication and initiation of a data session, and to serving node(s) 916 for communication thereafter. Server(s) 914 can also affect security, e.g., implement one or more firewalls, of macro network platform 910 to ensure network's operation and data integrity in addition to authorization and authentication procedures that CS GW node(s) 912 and PS GW node(s) 918 can enact. Moreover, server(s) 914 can provision services from external network(s), e.g., WAN 950, or global positioning system (GPS) network(s), which can be a part of enterprise NW(s) 980. It is to be noted that server(s) 914 can include one or more processors configured to confer at least in part the functionality of macro network platform 910. To that end, the one or more processors can execute code instructions stored in memory 930, for example.

In other embodiments, server(s) 910 can comprise policy server(s) to affect re-configuring, provisioning, etc. of a wireless device, UE, etc. to facilitate a use of a slice that is different from a slice that the wireless device originally attached, and that has been determined, by dynamic slice selection component 110, to be optimal for such use.

In core network environment 900, memory 930 can store information related to operation of macro network platform 910, e.g., related to operation of a wireless device (e.g., 102, 108), dynamic slice selection system 110, etc. The information can include data, business data, etc. associated with subscribers of respective services; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via service provider network; and so forth. Memory 930 can also store information from at least one of telephony network(s) 940, WAN 950, SS7 network 960, enterprise NW(s) 970, or service NW(s) 980.

In one or more embodiments, components of core network environment 900 can provide, e.g., via slice(s) that have been selected via dynamic slice selection system 110, communication services to a wireless device (e.g., 102, 108) via an over-the-air wireless link (e.g., 104, 106) corresponding to the RAN (101). In this regard, the RAN can include one or more: macro, Femto, or pico access points (APs) (not shown); base stations (BS) (e.g., 104); landline networks (e.g., optical landline networks, electrical landline networks) (not shown) communicatively coupled between the wireless device (e.g., 102) and macro network platform 910, etc.

Core network environment 900 can include one or more of the Internet (or another communication network (e.g., IP-based network)), or DSL-type or broadband network facilitated by Ethernet or other technology. In various embodiments, core network environment 900 can include hardware and/or software for allocating resources to the wireless device and dynamic slice selection system 110, converting or enforcing protocols, facilitating modification of communication policies for the wireless device, UE, etc. (e.g., with respect to facilitating selection/re-selection of slices by the wireless device based on a past use of other slice(s) by the wireless device), establishing and/or providing levels of quality of service (QoS), e.g., based on such communication policies, providing applications or services, translating signals, and/or performing other desired functions to facilitate system interoperability and communication to/from the wireless device, UE, etc. and service provider network 105.

In other embodiment(s), core network environment 900 can include data store component(s), a memory configured to store information, computer-readable storage media storing computer-executable instructions, e.g., memory 930, etc. enabling various operations performed via dynamic slice selection system 110 as described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "storage device", "storage media", "disk storage", "memory storage," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 930, non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1220 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM). Additionally, the disclosed memory components of systems or methods herein are intended to comprise, without being limited to comprising, these and any other suitable types of memory.

Figure 10:
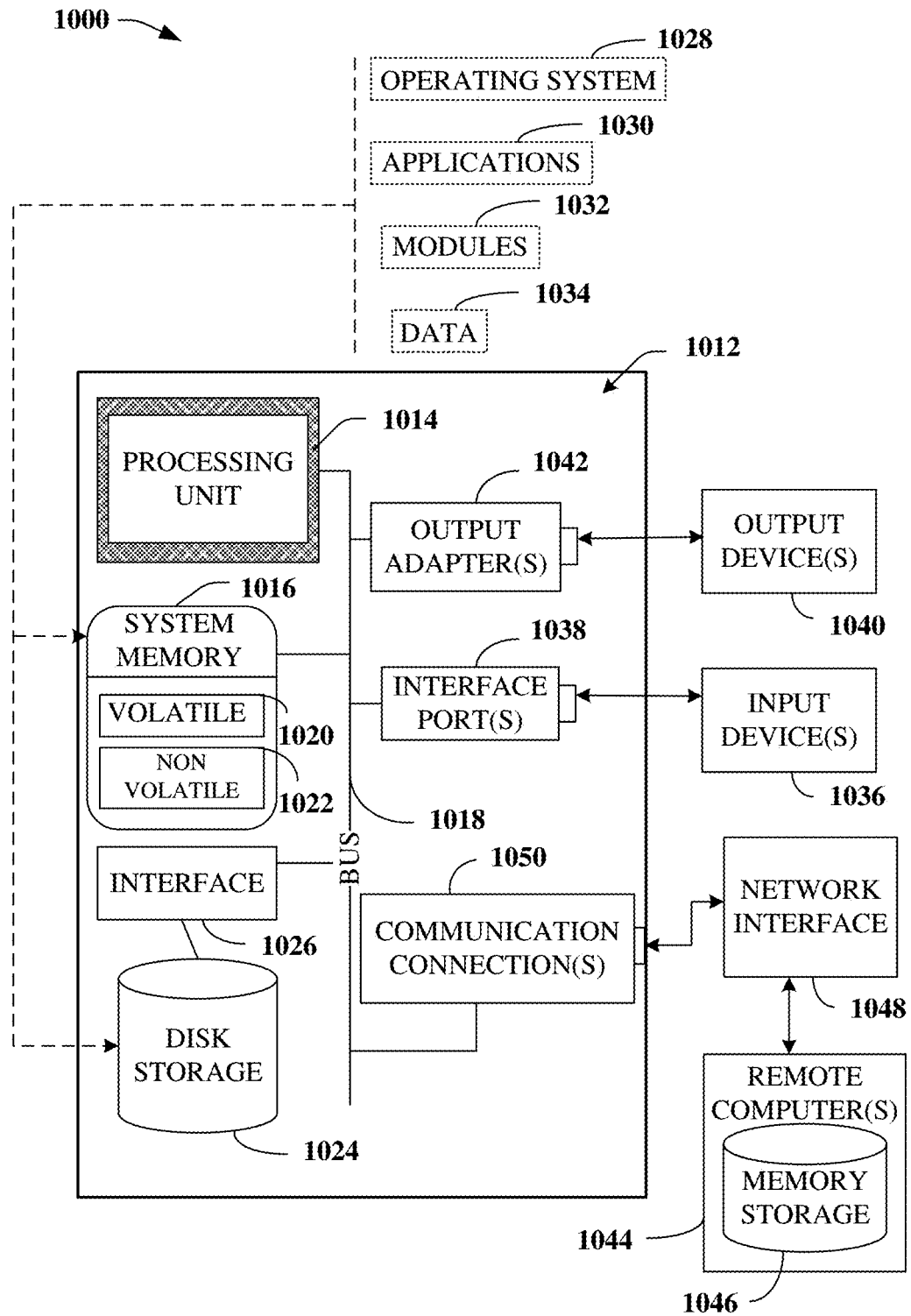
FIG. 10 is a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 include, for example, a serial port, a parallel port, a game port, a universal serial bus (USB), a wireless based port, e.g., WiFi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 include, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device (e.g., 1046) is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit-switching networks like integrated services digital networks (e.g., ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth wireless technologies. Thus, the communication can be a predefined structure as with a conventional network or simply an ad hoc communication between at least two devices.

WiFi allows connection to the Internet from a desired location (e.g., couch at home, a bed in a hotel room, a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., 4G, 5G, and beyond, IEEE 802.XX technology, e.g., Wi-Fi, Bluetooth, etc.; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), $x^{th}$ generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., UE, and/or within one or more elements of a network infrastructure, e.g., radio network controller, wireless access point (AP), etc.

Moreover, terms like "user equipment", "wireless device", "mobile station", "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., a dynamic network based slice selection environment (see e.g., 100) for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless system e.g., a wireless communication device, 102, 108, etc. for systems, methods, and/or apparatus disclosed herein can include a mobile device; a mobile phone; a 4G, 5G, and beyond device; a cellular communication device; a PSTN phone; a cellular communication device; a cellular phone; a satellite communication device; a satellite phone; a VoIP phone; a WiFi phone; a dual-mode cellular/WiFi phone; a combination cellular/VoIP/WiFi/WiMAX phone; a portable computer; or any suitable combination thereof. Specific examples of a wireless system can include, but are not limited to: a cellular device, such as a GSM, TDMA, CDMA, IS-95 and/or iDEN phone; a cellular/WiFi device, such as a dual-mode GSM, TDMA, IS-95 and/or iDEN/VoIP phone; UMTS phones; UMTS VoIP phones; or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, via policy rules of a policy framework, etc. as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module, component, etc. Thus, the classifier(s) can be used by an artificial intelligence system to automatically learn and perform a number of functions, e.g., performed by a system (e.g., dynamic slice selection system 110), including but not limited to: determining a network slice that is being used by a wireless device and a service that is being provided, via the network slice, to the wireless device; obtaining performance data corresponding to the service being provided, via the network slice, to the wireless device; and based on the performance data, determining whether the network slice satisfies a defined condition with respect to providing the service to the wireless device.

In one embodiment, the classifier(s) can be used by the artificial intelligence system to automatically determine, predict, anticipate, etc. event(s)/condition(s), e.g., poor QoS conditions corresponding to a use of a network slice by a wireless device. In turn, the system can determine an appropriate slice for the use.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
  a processor; and
  a memory that stores executable instructions that, when executed by the processor, facilitate performance of operations, comprising:
    determining, via a network query that has been directed to a user equipment, a first network slice that is being used by the user equipment and a service that is being provided, via the first network slice, to the user equipment, wherein the first network slice is associated with a virtual network function;
    obtaining performance data corresponding to the service being provided, via the first network slice, to the user equipment; and
    in response to determining that a network access and mobility management function has subscribed, via a network based notification service, to receive slice recommendations from the system without query by the user equipment, and in response to determining that the first network slice does not satisfy a defined condition with respect to providing the service to the user equipment, sending a slice recommendation directed to the network access and mobility management function to facilitate, via the network based notification service, a use of a second network slice by the user equipment.

2. The system of claim 1, wherein the operations further comprise:
in response to the determining that the first network slice does not satisfy the defined condition with respect to providing the service to the user equipment, selecting the second network slice for use in providing the service to the user equipment.

3. The system of claim 1, wherein the slice recommendation is a first slice recommendation, and wherein the operations further comprise:
in response receiving the slice query from the network access and mobility management function, sending a second slice recommendation directed to the network access and mobility management function.

4. The system of claim 2, wherein selecting the second network slice comprises:
updating, via a policy server, a network policy directing the user equipment to utilize the second network slice.

5. The system of claim 1, wherein determining the first network slice comprises:
determining that an application is being used by the user equipment; and
determining that the first network slice is being utilized by the application.

6. The system of claim 5, wherein the determining that the first network slice does not satisfy the defined condition comprises:
determining the first network slice does not satisfy the defined condition with respect to a type of the application being used by the user equipment.

7. The system of claim 6, wherein the type of the application comprises a web browser, a video sharing website, a music sharing website, a video streaming application, a music streaming application, a news streaming application, or an internet of things based application.

8. The system of claim 1, wherein the performance data comprises the defined condition with respect to at least one of packet loss corresponding to data being received by the user equipment, an availability of the service, a reliability metric corresponding to the service, an average delay of data being received by the user equipment, a peak delay of the data being received by the user equipment, a jitter corresponding to a periodic property of the data being received by the user equipment, or a bandwidth representing an amount of the data being received by the user equipment within a defined period.

9. A method, comprising:
determining, by a system comprising a processor, whether a characteristic of a communication service being provided to a user equipment via a first virtual network function satisfies a defined condition corresponding to an application of the user equipment; and
in response to the characteristic being determined not to satisfy the defined condition, and in response to an access and mobility management function of network equipment being determined to be subscribed, via a network based notification service, to receive slice recommendations from the network based notification service to facilitate receiving the slice recommendations without querying for the slice recommendations, reassigning, by the system, a second virtual network function to the user equipment to facilitate providing the communication service to the user equipment via the second virtual network function, wherein reassigning the second virtual network function comprises sending a slice recommendation recommending selection of the second virtual network function to the user equipment.

10. The method of claim 9, wherein the determining whether the characteristic satisfies the defined condition comprises:
determining at least one of an average delay of data being received, via the first virtual network function, by the user equipment or a peak delay of the data.

11. The method of claim 9, wherein the determining whether the characteristic satisfies the defined condition comprises at least one of:
determining a jitter corresponding to data being received, via the first virtual network function, by the user equipment,
determining a packet loss corresponding to the data,
determining an availability of the communication service, or
determining a reliability metric corresponding to the communication service.

12. The method of claim 9, wherein the determining whether the characteristic satisfies the defined condition comprises:
determining a bandwidth representing an amount of data being received, via the first virtual network function, by the user equipment over a defined period of time.

13. The method of claim 9, wherein reassigning the second virtual network function comprises:
creating the second virtual network function to facilitate providing the service to the user equipment via the second virtual network function.

14. The method of claim 9, wherein reassigning the second virtual network function comprises:
in response to receiving a query from the access and mobility management function, sending the slice recommendation directed to the access and mobility management function to facilitate providing the service to the user equipment via the second virtual network function.

15. The method of claim 9, wherein reassigning the second virtual network function comprises:
updating policy information instructing the user equipment to utilize the second virtual network function for the service.

16. A non-transitory machine-readable medium, comprising executable instructions that, when executed by a processor, facilitate performance of operations, comprising:
determining whether a communication characteristic of a first network slice being used by a user equipment satisfies a defined condition representing that the first network slice is inadequate for a corresponding application of the user equipment; and
in response to the communication characteristic being determined to satisfy the defined condition representing that the first network slice is inadequate for the corresponding application, modifying a slice policy of the user equipment to facilitate use of a second network slice for the corresponding application of the user equipment, wherein modifying the slice policy comprises
in response to determining that an access mobility and management function has subscribed to receive slice recommendations via a network based notification service, sending a slice recommendation of the slice recommendations directed to the access and mobility management function to facilitate a use of the second network slice by the user equipment without a slice query being received from the access and mobility management function.

17. The non-transitory machine-readable medium of claim 16, wherein the determining comprises:
   determining at least one of a packet loss corresponding to data being received by the user equipment, an availability of a service associated with the corresponding application, a reliability metric corresponding to the service, an average delay of the data being received by the user equipment, a peak delay of the data being received by the user equipment, a jitter corresponding to a periodic property of the data being received by the user equipment, or a bandwidth representing an amount of the data being received by the user equipment within a defined period.

18. The non-transitory machine-readable medium of claim 16, wherein modifying the slice policy comprises:
   sending, via an access and mobility management function, policy information represented by the slice policy to the user equipment.

19. The non-transitory machine-readable medium of claim 16, wherein the use is a first use, and wherein modifying the slice policy comprises:
   in response to receiving the slice query from the access and mobility management function, sending the slice recommendation directed to the access and mobility management function to facilitate a second use of the second network slice by the user equipment.

20. The non-transitory machine-readable medium of claim 16, wherein sending the slice recommendation comprises:
   creating the second network slice to facilitate the use of the second network slice by the user equipment.

* * * * *